US009685044B2

(12) United States Patent
Gangas et al.

(10) Patent No.: US 9,685,044 B2
(45) Date of Patent: Jun. 20, 2017

(54) METHODS AND SYSTEMS FOR CONDUCTING A NEW GAME BASED ON POKER AND A LIVE OR VIRTUAL OR PRE-RECORDED EVENT

(71) Applicant: Intralot S.A.—Integrated Lottery Systems and Services, Athens (GR)

(72) Inventors: Yiannis Gangas, Athens (GR); Evangelos Kalloudis, Athens (GR)

(73) Assignee: Intralot S.A.—Integrated Lottery Systems and Services, Athens (GR)

( * ) Notice: Subject to any disclaimer, the term of this patent is extended or adjusted under 35 U.S.C. 154(b) by 490 days.

(21) Appl. No.: 14/133,255

(22) Filed: Dec. 18, 2013

(65) Prior Publication Data

US 2014/0171172 A1 Jun. 19, 2014

Related U.S. Application Data

(60) Provisional application No. 61/738,496, filed on Dec. 18, 2012.

(51) Int. Cl.
G07F 17/32 (2006.01)
A63F 13/40 (2014.01)

(52) U.S. Cl.
CPC .......... G07F 17/3293 (2013.01); A63F 13/10 (2013.01); G07F 17/3267 (2013.01);
(Continued)

(58) Field of Classification Search
CPC .... G07F 17/32; G07F 17/326; G07F 17/3262; G07F 17/3267; G07F 17/3272; G07F 17/3288; G07F 17/3293
See application file for complete search history.

(56) References Cited

U.S. PATENT DOCUMENTS

2010/0203935 A1* 8/2010 Levy ................... G07F 17/3274
463/4
2010/0203938 A1 8/2010 Alderucci et al.
(Continued)

OTHER PUBLICATIONS

International Search Report and Written Opinion from International Application No. PCT/IB2013/003210 dated Aug. 28, 2014.

*Primary Examiner* — Dmitry Suhol
*Assistant Examiner* — David Duffy
(74) *Attorney, Agent, or Firm* — Greenberg Traurig, LLP

(57) ABSTRACT

A computer-implemented system and method that includes displaying a group of numbers to a first and second player. The system and method further includes receiving a group of N numbers and a sequence of numbers for first and second players. The system and method includes receiving a wager, fold indication or raise indication from the first or second player and receiving an event result that includes N winning numbers corresponding to winning participants and a winning sequence of N winning numbers. The system and method includes receiving a wager, fold indication or raise indication from a first or second player and comparing the N winning numbers and winning sequence to the numbers and sequences for the first and second players. The system and method includes identifying a winning player matching winning criteria of a higher ranking winning category and distributing a winning pool of wagers to the one winning player.

25 Claims, 10 Drawing Sheets

(52) U.S. Cl.
CPC ...... *G07F 17/3272* (2013.01); *G07F 17/3288* (2013.01); *A63F 2300/61* (2013.01); *A63F 2300/69* (2013.01)

(56) References Cited

U.S. PATENT DOCUMENTS

| | | | |
|---|---|---|---|
| 2014/0113713 A1* | 4/2014 | Fontaine | G07F 17/3262 463/28 |
| 2014/0256445 A1* | 9/2014 | Amaitis | A63F 13/795 463/40 |
| 2014/0302918 A1* | 10/2014 | Minitzer | G07F 17/323 463/26 |

* cited by examiner

METHODS AND SYSTEMS FOR CONDUCTING A NEW GAME BASED ON POKER AND A LIVE OR VIRTUAL OR PRE-RECORDED EVENT

RELATED APPLICATIONS

This application claims the benefit of U.S. Provisional Application No. 61/738,496, entitled "METHODS AND SYSTEMS FOR CONDUCTING A NEW GAME BASED ON POKER AND A LIVE OR VIRTUAL EVENT," filed Dec. 18, 2012, which is hereby incorporated by reference herein in its entirety for all purposes.

TECHNICAL FIELD

The instant invention relates to methods and systems for playing games of chance.

BACKGROUND

Methods and systems for playing games of chance are known.

SUMMARY OF INVENTION

In some embodiments, the present invention is a computer-implemented method for playing a game that includes displaying, on a screen of an electronic device, a group of X numbers to an at least one first player, wherein each number in the group of X numbers corresponds to a participant in an event. In an embodiment, the method further includes receiving, by the at least one specifically programmed computer system, a first group of N numbers from the group of X numbers for the at least one first player, wherein each number in the first group of N numbers is selected based, at least in part, on: (i) a first selection made by the at least one first player, or (ii) a first random selection made by the computer system.

In some embodiments, the method includes receiving, by the at least one specifically programmed computer system, a first sequence of the first group of N numbers for the at least one first player, wherein the first sequence of the first group of N numbers is selected based, at least in part, on: (i) a second selection made by the at least one first player, or (ii) a second random selection made by the computer system, and wherein N is greater than or equal to two.

In some embodiments, the method includes displaying, on the screen of the electronic device, the group of X numbers to an at least one second player and receiving, by the at least one specifically programmed computer system, the second group of N numbers from the group of X numbers for the at least one second player, wherein each number in the second group of N numbers is selected based, at least in part, on: (i) a third selection made by the at least one second player, or (ii) a third random selection made by the computer system.

In some embodiments, the method includes receiving, by the at least one specifically programmed computer system, a second sequence of the second group of N numbers for the at least one second player, wherein the second sequence of the second group of N numbers is selected based, at least in part, on: (i) a fourth selection made by the at least one second player, or (ii) a fourth random selection made by the computer system.

In some embodiments, receiving, by the at least one specifically programmed computer system, a first wager or a first fold indication from the at least one first player, wherein receiving the first fold indication results in the at least one first player withdrawing from the game; and receiving, by the at least one specifically programmed computer system, a first raise indication, a first call indication, or a second fold indication from the at least one second player, wherein receiving the first raise indication results in receiving a second wager from the at least one second player greater than the first wager, wherein receiving the first call indication results in receiving the second wager from the at least one second player equal to the first wager, and wherein receiving the second fold indication results in the at least one second player withdrawing from the game.

In some embodiments, the method includes receiving, by the at least one specifically programmed computer system, a result of the event, wherein the result of the event comprises: (i) N winning numbers corresponding to winning participants, and (ii) a winning sequence of the N winning numbers, and wherein the winning sequence of the N winning numbers is based on a winning order of the winning participants.

In some embodiments, the method includes receiving, by the at least one specifically programmed computer system, a third wager or a third fold indication from the at least one first player, wherein receiving the third fold indication results in the at least one first player withdrawing from the game and receiving, by the at least one specifically programmed computer system, a second raise indication, a second call indication or a fourth fold indication from the at least one second player, wherein receiving the second raise indication results in receiving a fourth wager from the at least one second player greater than the third wager, wherein receiving the second call indication results in receiving the fourth wager from the at least one second player equal to the third wager, wherein receiving the fourth fold indication results in the at least one second player withdrawing from the game, and wherein the wagers received from the at least one first player and the at least one second player form a winning pool.

In some embodiments, the method includes comparing, by the at least one specifically programmed computer system, the N winning numbers to: (i) the first group of N numbers and (ii) the second group of N numbers and comparing, by the at least one specifically programmed computer system, the winning sequence of the N winning numbers to: (i) the first sequence of N numbers in the first group and (ii) the second sequence of N numbers in the second group.

In some embodiments, the method includes identifying, based on the comparing steps, from the at least one first player and the at least one second player, at least one winning player matching winning criteria of a higher ranking winning category; wherein winning categories comprise: (i) a highest ranked winning category with winning criteria comprising: (a) the N numbers in the group associated with the at least one winning player match the N winning numbers and (b) the sequence of the N numbers in the group associated with the at least one winning player match the winning sequence of N winning numbers; (ii) a second winning category with winning criteria comprising: the N numbers in the group associated with the at least one winning player match the N winning numbers.

In some embodiments, the method includes distributing, by the at least one specifically programmed computer system, the winning pool to the at least one winning player.

In some embodiments, the method includes winning categories that include: (iii) a third winning category with winning criteria comprising: (a) N−1 numbers in the group associated with the at least one winning player match N−1 winning numbers and (b) a first number and a second number in the sequence of the N numbers in the group associated with the at least one winning player match a corresponding first number and a corresponding second number in the winning sequence of N winning numbers.

In some embodiments, the method includes winning categories that include: (iv) a fourth winning category with winning criteria comprising: (a) the first number in the sequence of the N numbers in the group associated with the at least one winning player matches either the first number or the second number in the winning sequence of N winning numbers and (b) the second number in the sequence of the N numbers in the group associated with the at least one winning player matches either the first number or the second number in the winning sequence of N winning numbers and (v) a fifth winning category with winning criteria comprising the first number in the sequence of the N numbers in the group associated with the at least one winning player matches the corresponding first number in the winning sequence of N winning numbers.

In some embodiments, the method includes winning categories that include: (vi) a sixth winning category with winning criteria comprising the first number in the sequence of the N numbers in the group associated with the at least one winning player matches the second number in the winning sequence of N winning numbers; and (vii) a seventh winning category with winning criteria comprising the first number in the sequence of the N numbers in the group associated with the at least one winning player matches a third number in the winning sequence of N winning numbers.

In some embodiments, the method includes winning categories that include: (viii) an eighth winning category with winning criteria comprising the first number in the sequence of the N numbers in the group associated with the at least one winning player matches a fourth number in the winning sequence of N winning numbers.

In some embodiments, the method includes winning categories that include: (ix) a ninth winning category with winning criteria comprising the first number in the sequence of the N numbers in the group associated with the at least one winning player matches a fifth number in the winning sequence of N winning numbers; and (x) a tenth winning category with winning criteria comprising the first number in the sequence of the N numbers in the group associated with the at least one winning player matches a sixth number in the winning sequence of N winning numbers.

In some embodiments, the method includes winning categories that include: (xi) an eleventh winning category with winning criteria comprising the first number in the sequence of the N numbers in the group associated with the at least one winning player matches a seventh number in the winning sequence of N winning numbers; and (xii) a twelfth winning category with winning criteria comprising the first number in the sequence of the N numbers in the group associated with the at least one winning player matches an eighth number in the winning sequence of N winning numbers.

In some embodiments, the method includes receiving, by the at least one specifically programmed computer system, a fifth wager or a fifth fold indication from the at least one first player, wherein receiving the fifth fold indication results in the at least one first player withdrawing from the game; and receiving, by the at least one specifically programmed computer system, a third raise indication, a third call indication or a sixth fold indication from the at least one second player, wherein receiving the third raise indication results in receiving a sixth wager from the at least one second player greater than the fifth wager, wherein receiving the third call indication results in receiving the sixth wager from the at least one second player equal to the fifth wager, wherein receiving the sixth fold indication results in the at least one second player withdrawing from the game.

In some embodiments, the receiving, by the at least one specifically programmed computer system, the fifth wager or the fifth fold indication from the at least one first player step and the receiving, by the at least one specifically programmed computer system, the third raise indication, the third call indication or the sixth fold indication from the at least one second player step are completed before the receiving, by the at least one specifically programmed computer system, the result of the event step.

In some embodiments, the method includes generating, by the at least one specifically programmed computer system, at least one first game piece; and generating, by the at least one specifically programmed computer system, at least one second game piece.

In some embodiments, the method includes N ranging from 2 to 15. In some embodiments, the method includes N ranging from 2 to 5.

In some embodiments, the method includes X equals to a number of participants in the event.

In some embodiments, the method includes an event that is selected from the group consisting of a live event, a virtual event, a past event, and combinations thereof.

In some embodiments, the method includes a past event that is recorded prior to receiving, by the at least one specifically programmed computer system, the result of the event step.

In some embodiments, the method includes an event that is an event having a sequential finishing order.

In some embodiments, the method includes an event selected from the group consisting of horse racing, greyhound racing, automobile racing, motorcycle racing, football, basketball, baseball, soccer, and hockey.

In some embodiment, the present invention is a computer system that includes at least one specialized computer machine that includes a non-transient memory having at least one region for storing particular computer executable program code; and at least one processor for executing the particular program code stored in the memory, wherein the particular program code is configured to at least perform the following operations: displaying, on a screen of an electronic device, a group of X numbers to an at least one first player, wherein each number in the group of X numbers corresponds to a participant in an event.

In some embodiments, the particular program code is configured to at least perform the following: receiving, by an at least one specifically programmed computer system, a first group of N numbers from the group of X numbers for the at least one first player, wherein each number in the first group of N numbers is selected based, at least in part, on: (i) a first selection made by the at least one first player, or (ii) a first random selection made by the computer system; and receiving, by the at least one specifically programmed computer system, a first sequence of the first group of N numbers for the at least one first player, wherein the first sequence of the first group of N numbers is selected based, at least in part, on: (i) a second selection made by the at least one first player, or (ii) a second random selection made by the computer system and wherein N is greater than or equal to two.

In some embodiments, the particular program code is configured to at least perform the following: displaying, on the screen of the electronic device, the group of X numbers to an at least one second player; receiving, by the at least one specifically programmed computer system, the second group of N numbers from the group of X numbers for the at least one second player, wherein each number in the second group of N numbers is selected based, at least in part, on: (i) a third selection made by the at least one second player, or (ii) a third random selection made by the computer system and receiving, by the at least one specifically programmed computer system, a second sequence of the second group of N numbers for the at least one second player, wherein the second sequence of the second group of N numbers is selected based, at least in part, on: (i) a fourth selection made by the at least one second player, or (ii) a fourth random selection made by the computer system.

In some embodiments, the particular program code is configured to at least perform the following: receiving, by the at least one specifically programmed computer system, a first wager or a first fold indication from the at least one first player, wherein receiving the first fold indication results in the at least one first player withdrawing from the game; and receiving, by the at least one specifically programmed computer system, a first raise indication, a first call indication, or a second fold indication from the at least one second player, wherein receiving the first raise indication results in receiving a second wager from the at least one second player greater than the first wager, wherein receiving the first call indication results in receiving the second wager from the at least one second player equal to the first wager, and wherein receiving the second fold indication results in the at least one second player withdrawing from the game and receiving, by the at least one specifically programmed computer system, a result of the event, wherein the result of the event comprises: (i) N winning numbers corresponding to winning participants, and (ii) a winning sequence of the N winning numbers, wherein the winning sequence of the N winning numbers is based on a winning order of the winning participants.

In some embodiments, the particular program code is configured to at least perform the following: receiving, by the at least one specifically programmed computer system, a third wager or a third fold indication from the at least one first player, wherein receiving the third fold indication results in the at least one first player withdrawing from the game and receiving, by the at least one specifically programmed computer system, a second raise indication, a second call indication or a fourth fold indication from the at least one second player, wherein receiving the second raise indication results in receiving a fourth wager from the at least one second player greater than the third wager, wherein receiving the second call indication results in receiving the fourth wager from the at least one second player equal to the third wager, wherein receiving the fourth fold indication results in the at least one second player withdrawing from the game, and wherein the wagers received from the at least one first player and the at least one second player form a winning pool.

In some embodiments, the particular program code is configured to at least perform the following: comparing, by the at least one specifically programmed computer system, the N winning numbers to: (i) the first group of N numbers and (ii) the second group of N numbers and comparing, by the at least one specifically programmed computer system, the winning sequence of the N winning numbers to: (i) the first sequence of N numbers in the first group and (ii) the second sequence of N numbers in the second group.

In some embodiments, the particular program code is configured to at least perform the following: identifying, based on the comparing steps, from the at least one first player and the at least one second player, a at least one winning player matching winning criteria of a higher ranking winning category, wherein winning categories comprise: (i) a highest ranked winning category with winning criteria comprising: (a) the N numbers in the group associated with the at least one winning player match the N winning numbers and (b) the sequence of the N numbers in the group associated with the at least one winning player match the winning sequence of N winning numbers, (ii) a second winning category with winning criteria comprising: the N numbers in the group associated with the at least one winning player match the N winning numbers, and (iii) a third winning category with winning criteria comprising: (a) N−1 numbers in the group associated with the at least one winning player match N−1 winning numbers and (b) a first number and a second number in the sequence of the N numbers in the group associated with the at least one winning player match a corresponding first number and a corresponding second number in the winning sequence of N winning numbers.

In some embodiments, the particular program code is configured to at least perform the following: distributing, by the at least one specifically programmed computer system, the winning pool to the at least one winning player.

In some embodiments, the winning categories further comprise: (iv) a fourth winning category with winning criteria comprising: (a) the first number in the sequence of the N numbers in the group associated with the at least one winning player matches either the first number or the second number in the winning sequence of N winning numbers and (b) the second number in the sequence of the N numbers in the group associated with the at least one winning player matches either the first number or the second number in the winning sequence of N winning numbers, (v) a fifth winning category with winning criteria comprising the first number in the sequence of the N numbers in the group associated with the at least one winning player matches the corresponding first number in the winning sequence of N winning numbers, (vi) a sixth winning category with winning criteria comprising the first number in the sequence of the N numbers in the group associated with the at least one winning player matches the second number in the winning sequence of N winning numbers, and (vii) a seventh winning category with winning criteria comprising the first number in the sequence of the N numbers in the group associated with the at least one winning player matches a third number in the winning sequence of N winning numbers.

In some embodiments, the winning categories further comprise: (viii) an eighth winning category with winning criteria comprising the first number in the sequence of the N numbers in the group associated with the at least one winning player matches a fourth number in the winning sequence of N winning numbers, (ix) a ninth winning category with winning criteria comprising the first number in the sequence of the N numbers in the group associated with the at least one winning player matches a fifth number in the winning sequence of N winning numbers, and (x) a tenth winning category with winning criteria comprising the first number in the sequence of the N numbers in the group associated with the at least one winning player matches a sixth number in the winning sequence of N winning numbers.

In some embodiments, the winning categories further comprise: (xi) an eleventh winning category with winning criteria comprising the first number in the sequence of the N numbers in the group associated with the at least one winning player matches a seventh number in the winning sequence of N winning numbers; and (xii) a twelfth winning category with winning criteria comprising the first number in the sequence of the N numbers in the group associated with the at least one winning player matches an eighth number in the winning sequence of N winning numbers.

In some embodiments, N ranges from 2 to 15. In some embodiments, N ranges from 2 to 5.

In some embodiments, the event is selected from the group consisting of a live event, a virtual event, a past event, and combinations thereof. In some embodiments, the past event is recorded prior to receiving, by the at least one specifically programmed computer system, the result of the event step.

In some embodiments, the event is an event having a sequential finishing order. In some embodiments, the event is selected from the group consisting of horse racing, greyhound racing, automobile racing, motorcycle racing, football, basketball, baseball, soccer, and hockey.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
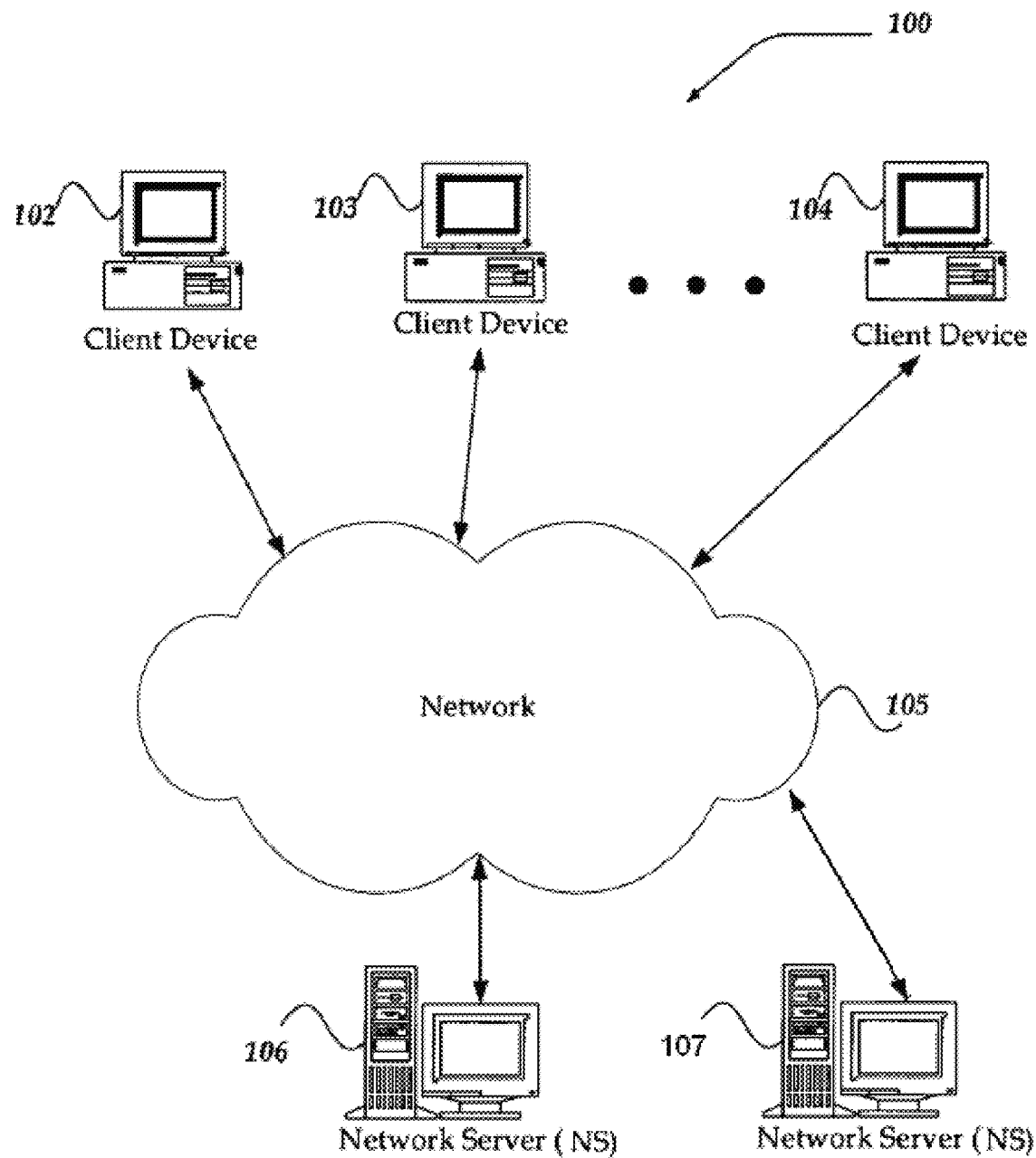
FIG. 1 illustrates features of some embodiments of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Illustrative Operating Environments

FIG. 1 illustrates one embodiment of an environment in which the present invention may operate. However, not all of these components may be required to practice the invention, and variations in the arrangement and type of the components may be made without departing from the spirit or scope of the invention. In some embodiments, the inventive system and method may include a large number of members and/or concurrent transactions. In some embodiments, players may participate without the use of electronic devices (e.g. players sitting in a real environment) using real components—i.e., not virtual components. In other embodiments, the inventive system and method are based on a scalable computer and network architecture that incorporates varied strategies for assessing the data, caching, searching, and database connection pooling. An example of the scalable architecture is an architecture that is capable of operating with multiple servers.

In embodiments, members of the inventive computer system 102-104 (e.g. vending machines) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, tablet computers, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, the invention is programmed in either Java, .Net, QT, C, C++ or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), cloud based networks, direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link.

In essence, in some embodiments, network 105 includes any communication method by which information may travel between client devices 102-104, and servers 106 and 107.

Figure 2:
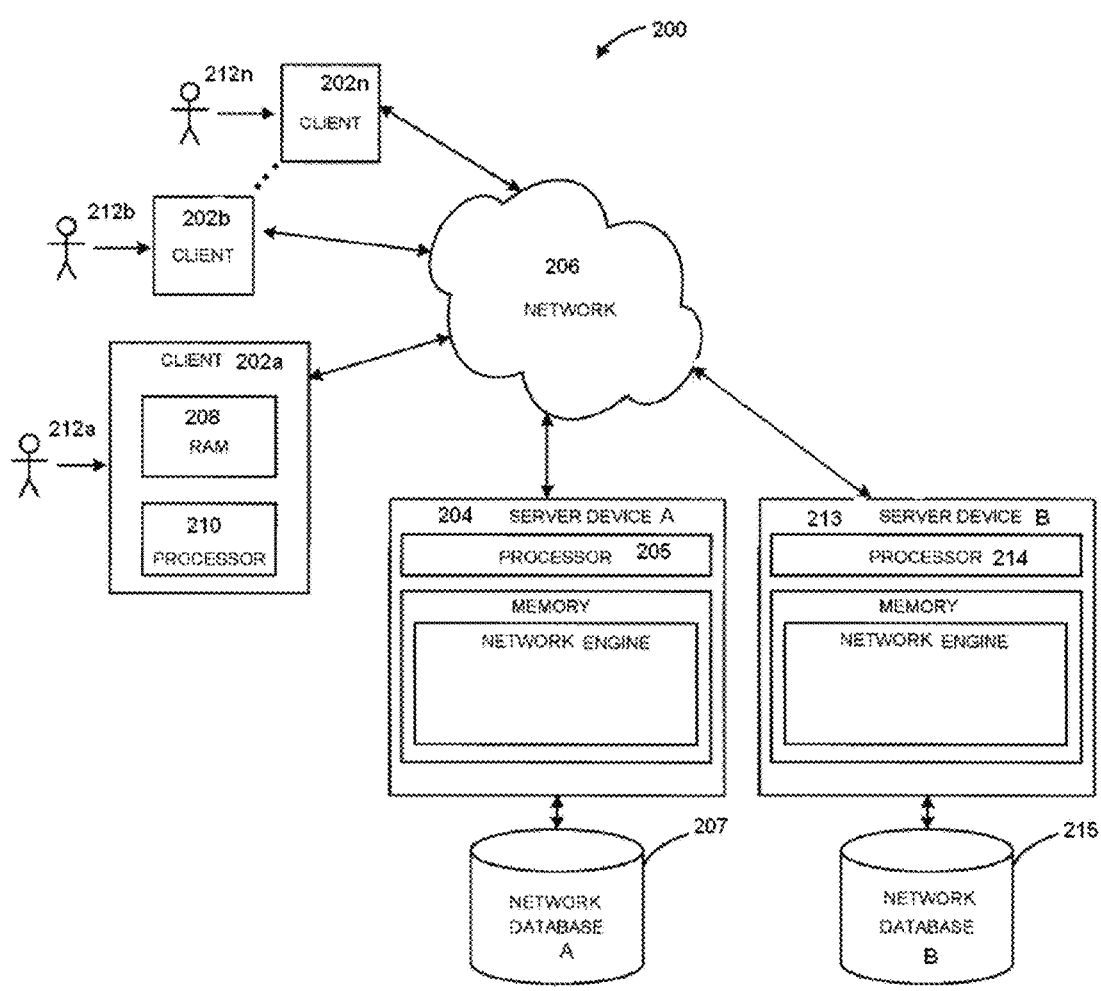
FIG. 2 illustrates features of some embodiments of the present invention.
Figure 3:
FIG. 3 is a screen shot illustrating some embodiments of the present invention.
Figure 4:
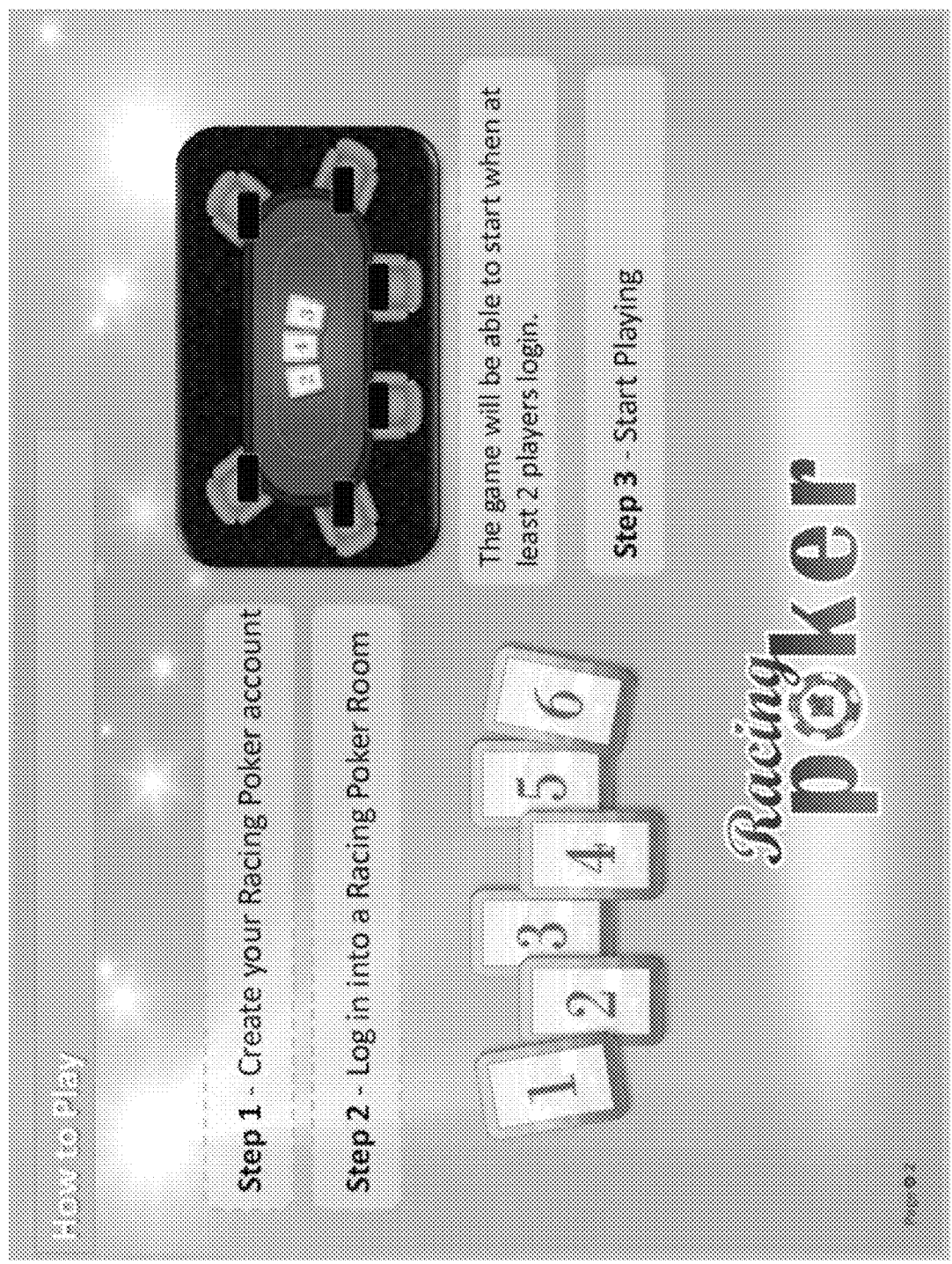
FIG. 4 is a screen shot illustrating some embodiments of the present invention.
Figure 5:
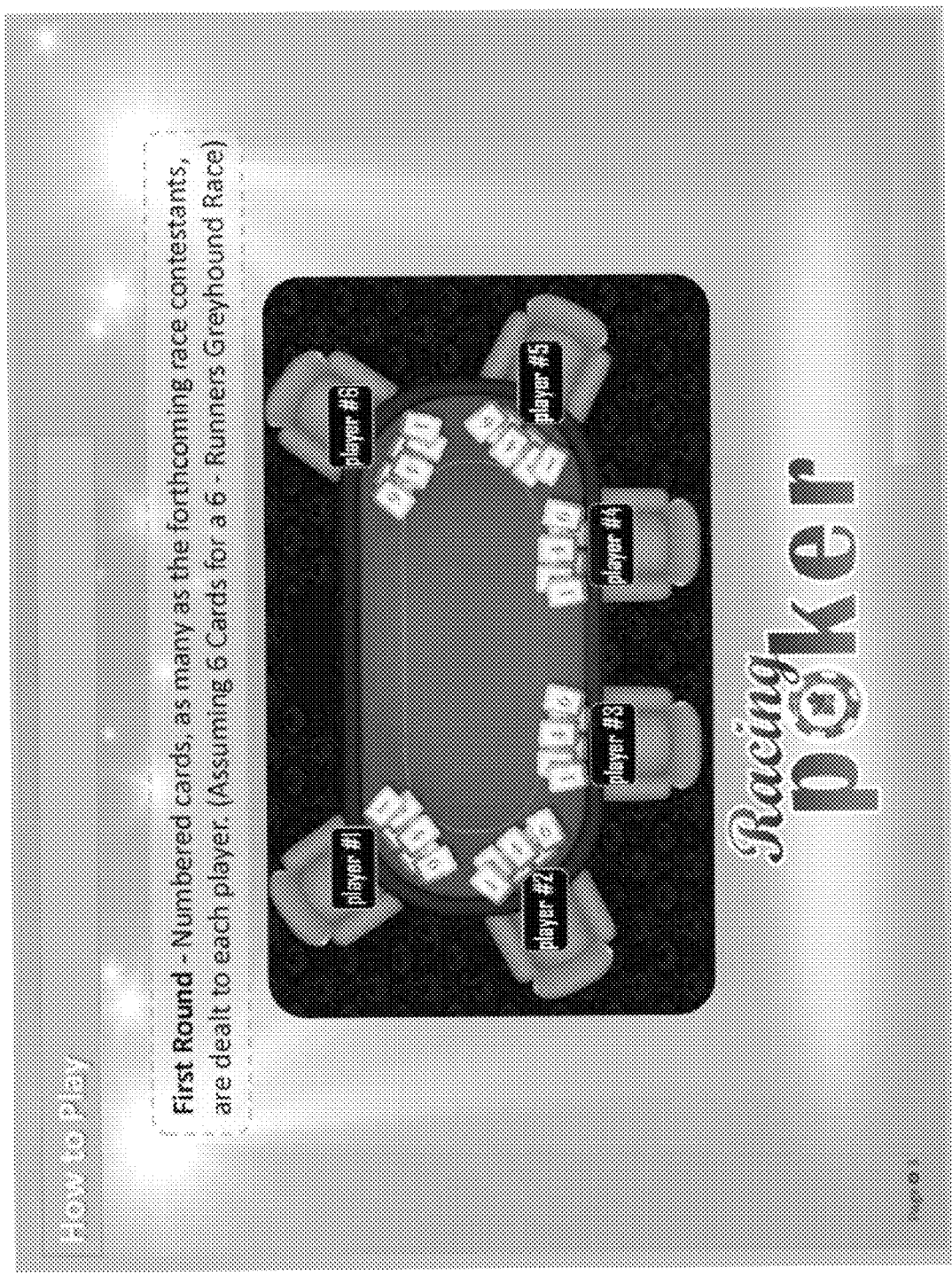
FIG. 5 is a screen shot illustrating some embodiments of the present invention.
Figure 6:
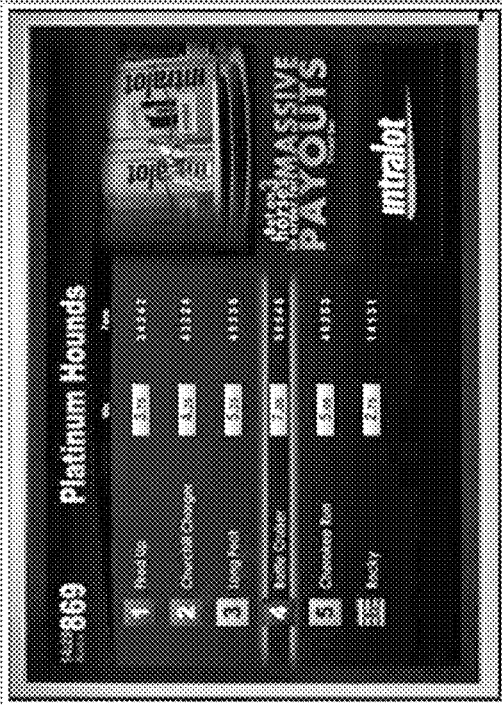
FIG. 6 is a screen shot illustrating some embodiments of the present invention.
Figure 7:
FIG. 7 is a screen shot illustrating some embodiments of the present invention.
Figure 8:
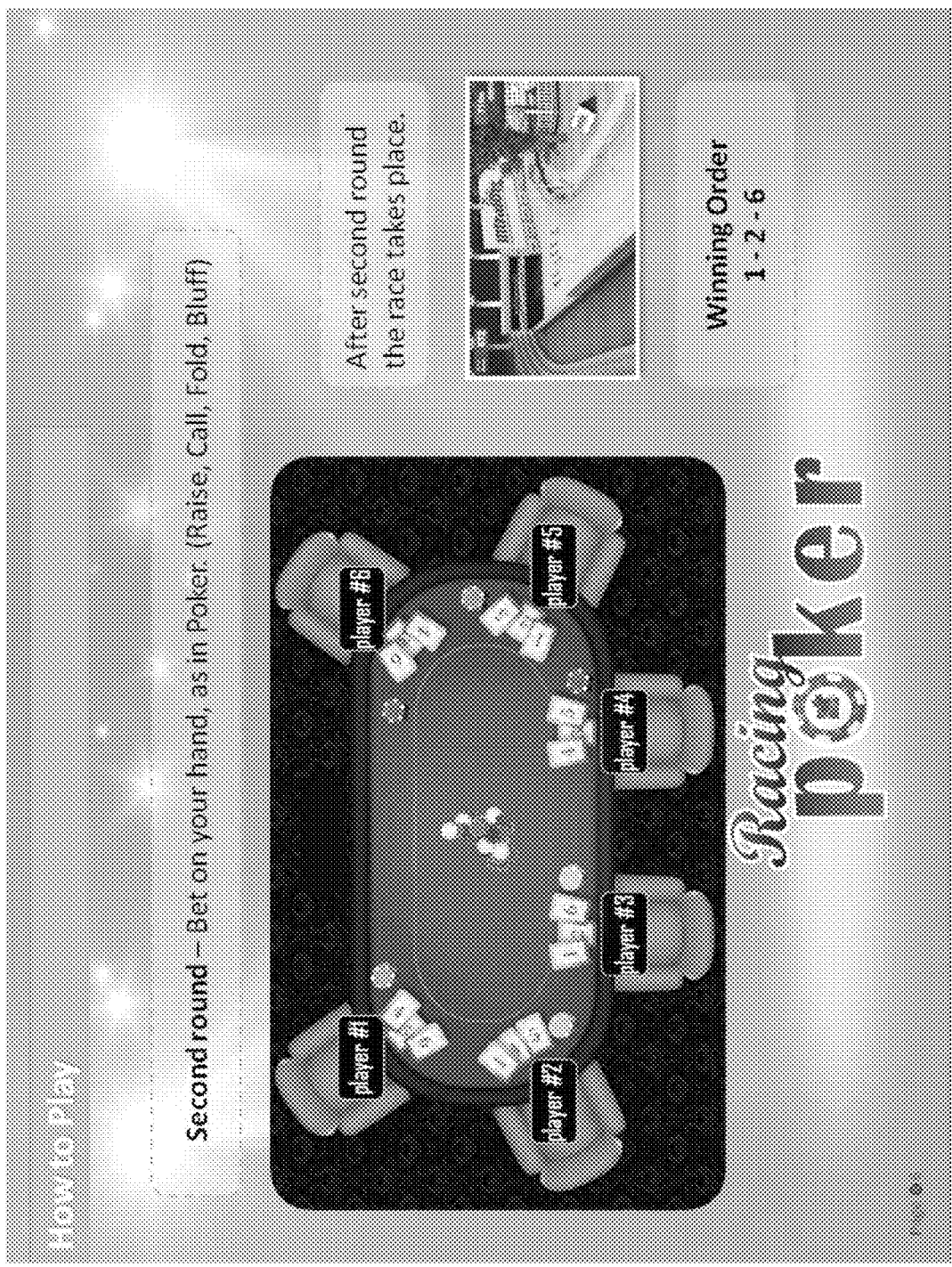
FIG. 8 is a screen shot illustrating some embodiments of the present invention.
Figure 9:
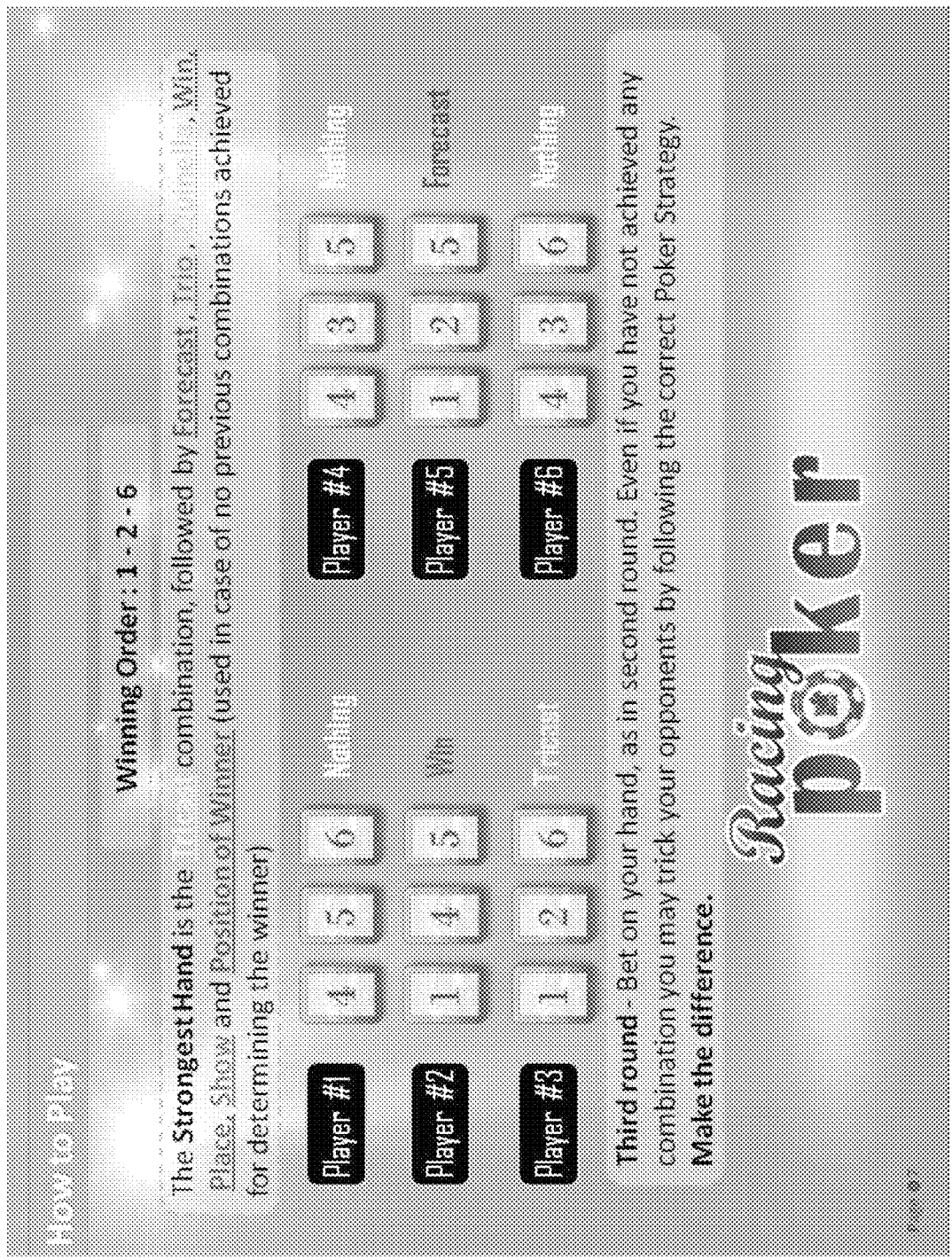
FIG. 9 is a screen shot illustrating some embodiments of the present invention.
Figure 10:
FIG. 10 is a screen shot illustrating some embodiments of the present invention.

FIG. 2 shows another exemplary embodiment of the computer and network architecture that supports the inventive method and system. The member devices 202a, 202b thru 202n shown (e.g., vending machines) each at least includes a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, cloud storage or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a is any type of processor-based platform that is connected to a network 206 and that interacts with one or more application programs. Client devices 202a-n may operate on any operating system capable of supporting a browser or browser-enabled application, such as Microsoft Windows™, Apple iOS, Google Android or Linux. The client devices 202a-n shown may include, for example, personal computers executing a browser application program such as Microsoft Corporation's Internet Explorer™, Apple Computer, Inc.'s Safari™, Mozilla Firefox, and Opera or a standalone application via an online application store such as Apple Store, Google Play/Chrome Store, and/or Microsoft Store. Through the client devices 202a-n, users (e.g. players, agents, etc.) 212a-n communicate over the network 206 with each other and with other systems and devices coupled to the network 206. As shown in FIG. 2, server devices 204 and 213 may be also coupled to the network 206.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

In some embodiments, the game described herein is used with Internet and mobile media.

For purposes of some embodiments, the term "game piece" means either physical form (e.g., a ticket, etc.) or electronic presentation which are representative of at least some data required for participation in a game. In some embodiments, all game pieces are rendered in physical form. In some embodiments, all game pieces are rendered in electronic representation form. In some embodiments, at least one game piece of the game is in physical form and at least one game piece of the game is in electronic representation form. In some embodiments, the game pieces are in the form of cards wherein each card is a separate game piece and series of game pieces forms a "hand".

For purposes of some embodiments, the term "indicia" means visible and/or invisible representations of game data on a game piece. In some embodiments, the term "indicia" can be, for example, but is not limited to, number(s), character(s), geometrical shapes, playing cards, dice, game boards, and/or combination(s) thereof.

In some embodiments, the instant invention can provide a method to conduct a game that at least includes steps of: providing, by a computer system, at least one first game piece to at least one first player and at least on second game piece to at least one second player, where the at least one first game piece has a first game data of the game and where the at least one second game pieces has a second game data of the game, where the first game data includes a first number and where the second game data includes a second number, and where the first number and the second number are each associated with at least one participant of at least one event; receiving, by a computer system, one or more first wagers from the first player and the second player; receiving, by computer system, data identifying a winning participant of the at least one event; where the number associated with the winning participant of the at least one event is a winning number; receiving, by computer system, one or more second wagers from the first player and the second player; and awarding the first wagers and the second wagers to a player with a number that matches the winning number of the game.

In some embodiments, the game includes players attempting to predict the order of participants in an event. In some embodiments, the game may include the first three participants. In some embodiments, the game may include the first four or five or more participants. In some embodiments, the game includes three rounds including, but not limited to, one round of selecting and ordering game pieces and two rounds of wagering that may include poker-style wagering such as raise, call, fold, and/or bluff as described below. In some embodiments, as used herein, the phrases "raise indication", "fold indication", or "call indication" are used to indicate a player's intention to raise, fold, or call, respectively.

In some embodiments more than two rounds of wagering may be conducted. In some embodiments, three rounds of wagering may be conducted. In some embodiments, the third round of wagering will be conducted before the event is completed. In some embodiments, the third round of wagering will be conducted while the display of the event is paused. In some embodiments, four rounds of wagering may be conducted. In some embodiments, five rounds of wagering may be conducted. In some embodiments, seven rounds of wagering may be conducted. In some embodiments, 2 to 10 rounds of wagering may be conducted. In some embodiments, more than 10 rounds of wagering may be conducted.

In some embodiment, the number of players ranges from 2 to 100. In some embodiments, the number of player rangers from 2 to 50. In some embodiments, the number of player rangers from 2 to 40. In some embodiments, the number of player rangers from 2 to 30. In some embodiments, the number of player rangers from 2 to 20. In some embodiments, the number of player rangers from 2 to 15. In some embodiments, the number of player rangers from 2 to 10. In some embodiments, the number of player rangers from 2 to 8. In some embodiments, the number of player rangers from 5 to 100. In some embodiments, the number of player rangers from 10 to 100. In some embodiments, the number of player rangers from 15 to 100. In some embodiments, the number of player rangers from 20 to 100. In some embodiments, the number of player rangers from 30 to 100. In some embodiments, the number of player rangers from 50 to 100. In some embodiments, the number of players exceeds 100.

In some embodiments, each player may participate in more than one game.

In some embodiments, the game data may include, for example, but is not limited to, number(s), character(s), geometrical shapes, playing cards, dice, game boards, and/or combination(s) thereof.

In some embodiments, the providing the first game data and the second game data of the game occurs concomitantly with a payment for playing the game is received from each player. In some embodiments, the wagers are paid before and after the event.

In some embodiments, the payment and/or wagers will be in the form of currency, a credit card, a debit card, and/or mobile electronic device that can include, but is not limited to, a mobile phone, Personal Digital Assistant (PDA), Blackberry™, Pager, Smartphone, or any other reasonable mobile electronic device with a mobile application such as Google Wallet or equivalent to generate payment.

In some embodiments, players may participate in the game using virtual currency such as chips and/or other form of currency described above.

In some embodiments, the game piece can be generated by and/or shown at a lottery or other type of gaming terminal such as a gaming machine. In some embodiments, the game piece is electronic data/representation indicative of the game data (e.g., graphical representation of the first part of the game on a monitor, etc.). In some embodiments, the game piece is shown on a computer, a phone, a mobile phone, tablet, Personal Digital Assistant (PDA), Blackberry™, Pager, Smartphone, or any other computing device In some embodiments, the method includes one or more players create a real or virtual player group. In some embodiments, the game begins when at least two players create a real or virtual player group.

In some embodiments, the method includes players receiving one or more game pieces with game data that includes a number(s), character(s), geometrical shapes, playing cards, dice, game boards, and/or combination(s) thereof related to a participant in an event. In some embodiments, the players receive one or more game pieces with a number associated with a participant in an event. In some embodiments, the game pieces include real or virtual playing cards.

In some embodiments, the event may include, but is not limited to, horse racing, greyhound racing, motor sports such as automobile and motorcycle racing, and/or other racing related sports with a finishing order of participants that can be conclusively determined. In some embodiments, the event may include, but is not limited to, non-racing sports such as football, basketball, baseball, soccer, hockey, and/or other related sports.

In some embodiments, the event is live. In some embodiments, the event is pre-recorded. In some embodiments, the event is virtual. In some embodiments, the event is virtual with the winning participants selected by a random number generator.

In some embodiments, the participants are human. In some embodiments, the participants are animals such as horses and/or dogs. In some embodiments, the participants are virtual.

In some embodiments, the odds of each participant winning the event are provided to the players. In some embodiments, additional information related to the participants and/or event is provided to the players. In some embodiments, the additional information may include, but is not limited to, historical winning results, current event conditions such as weather, track quality, health of the participants or other information potentially pertinent to selecting a participant.

In some embodiments, the method includes players selecting or randomly receiving one or more game pieces with game data associated with participants in an event. In some embodiments, the players select or randomly receive the one or more game pieces with game data based on the predicted winning participants of the event ("the predicted winning participants"). In some embodiments, the players select or randomly receive the one or more game pieces with game data based on the predicted order of winning participants of the event ("the predicted order of winning participants"). As used herein, "order" and "sequence" are used interchangeably and may refer to participants in an event, numbers, or combinations thereof.

In some embodiments, the players select or randomly receive three game pieces with game numbers associated with the predicted three winning participants in an event. In some embodiments, the players select or randomly receive three game pieces with game numbers associated with the predicted three winning participants in an event and the players order the three game pieces based on the predicted order of winning participants in an event.

In some embodiments, the players select or randomly receive four game pieces with game numbers associated with the predicted four winning participants in an event. In some embodiments, the players select or randomly receive four game pieces with game numbers associated with the predicted four winning participants in an event and the players order the four game pieces based on the predicted order of winning participants in an event.

In some embodiments, the players select or randomly receive five game pieces with game numbers associated with the predicted five winning participants in an event. In some embodiments, the players select or randomly receive five game pieces with game numbers associated with the predicted five winning participants in an event and the players order the five game pieces based on the predicted order of winning participants in an event.

In some embodiments, the players select or randomly receive more than five game pieces with game numbers associated with the predicted more than five winning participants in an event. In some embodiments, the players select or randomly receive more than five game pieces with game numbers associated with the predicted more than five winning participants in an event and the players order the more than five game pieces based on the predicted order of winning participants in an event.

In some embodiments, the game pieces not selected by the players are removed from the game.

In some embodiments, the game pieces are cards included in a players "hand" similar to poker or other card game.

In some embodiments, the players participate in a first round of wagering after the players select or randomly receive the game pieces. In some embodiments, the wagering is poker-style wagering. In some embodiments, the wagering is based on wagering associated with other card games.

In some embodiments, the first round of wagering includes a first player providing a wager. In some embodiments, the wager may be based at least in part on the likelihood that the player's predicted winning participants and/or predicted order of winning participants matches the actual winning participants and/or actual order of winning participants. In some embodiments, the wager may be a "bluff" where the likelihood of the player's predicted winning participants and/or predicted order of winning participants matching the actual winning participants and/or actual order of winning participants is low.

In some embodiments, after the first player provides a wager, the second player may increase the amount of the wager ("raise"), provide an equal wager ("call"), or withdraw from the game ("fold"). In some embodiments, each player continues to raise, call, or fold until all players have either raised, called, or folded. In some embodiments, each round of wagers is compiled to form a "winning pool". In some embodiments, all rounds of wagers are compiled to form a "winning pool." In some embodiments, the first round of wagers is compiled to form a "winning pool".

In some embodiments, after the first round of wagering, the event is conducted. In some embodiments, the numbers associated with the winning participants ("the winning participants") of the event are provided to the players. In some embodiments, the numbers associated with the winning participants are provided to the players along with the order of winning participants ("the order of winning participants"). In some embodiments, the number associated with the first place participant is provided first, the number associated with the second place participant is provided second, the number of the third place participant is provided third, and so on until the number associated with each participant has been placed in the order the participant finished the event thus generating a number corresponding to the order of winning participants.

In some embodiments, the players that have not folded during the first round of wagering participate in a second round of wagering conducted after the winning participants and/or the order of winning participants of the event have been provided.

In some embodiments, the second round of wagering includes a first player providing a wager. In some embodiments, the wagering is poker-style wagering. In some embodiments, the wagering is based on wagering associated with other card games.

In some embodiments, after the first player provides a wager, the second player may raise, call, or fold. In some embodiments, each active player (i.e., each player that has not folded during the first or second round of wagering) continues to raise, call, or fold until all active players have either raised, called, or folded. In some embodiments, the second round of wagers are compiled with the first round of wagers to form the winning pool.

In some embodiments, after the second round of wagering is complete, each active player compares the player's predicted winning participants with the winning participants and/or the predicted order of winning participants with the order of winning participants. In some embodiments, the player with the predicted winning participants and the predicted order of winning participants most closely matching the corresponding winning participants and order of winning participants, wins the game and receives the winning pool.

In some embodiments, the winning player may not be the player with the highest ranked games pieces. In some embodiments, the winning player may have "bluffed" another player with higher ranked game pieces.

In some embodiments, the ranking of winning "hands" is at least partially based on rankings in a horse and/or a dog race and/or other event.

In some embodiments, in a game where three game pieces are selected or randomly received, the game pieces with the predicted winning participants and the predicted order of winning participants are compared to the winning participants and the order of winning participants to determine a winning player based on, but not limited to, the following rankings (i.e., the active player with highest ranking wins the winning pool):

First—first three predicted winning participants equal the first three winning participants and the first three predicted order of participants equals the first three order of winning participants ("tricast").

Second—first three predicted winning participants equal the first three winning participants ("trio").

Third—first two participants in the predicted order of winning participants equal the first two winning participants in the order of first two winning participants ("forecast").

Fourth—first two predicted winning participants equal the first two winning participants ("quinella").

Fifth—first participant in the predicted order of winning participants equals the first participant in the order of winning participants ("win").

Sixth—first participant in the predicted order of winning participants equals the second participant in the order of winning participants ("place").

Seventh—first participant in the predicted order of winning participants equals the third participant in the order of winning participants ("show").

Eighth—first participant in the predicted order of winning participants equals the fourth, fifth, sixth and so on participant in the order of winning participants ("position of winner").

In some embodiments, in a game where five game pieces are selected or randomly received, the game pieces with the predicted winning participants and the predicted order of winning participants are compared to the winning participants and the order of winning participants to determine a winning player based on the following rankings, but not limited to:

First—First five predicted winning participants equal the first five winning participants and the first five predicted order of participants equals the order of the first five winning participants ("pentafecta").

Second—first four participants in the predicted order of winning participants equal the first four winning participants in the order of the first four winning participants ("superfecta").

Third—first three predicted winning participants equal the first three winning participants and the first three predicted order of participants equals the first three order of winning participants ("tricast").

Fourth—first three predicted winning participants equal the first three winning participants ("trio").

Fifth—first two participants in the predicted order of winning participants equal the first two winning participants in the order of first two winning participants ("forecast").

Sixth—first two predicted winning participants equal the first two participants winning participants ("quinella").

Seventh—first participant in the predicted order of winning participants equals the first participant in the order of winning participants ("win").

Eighth—first participant in the predicted order of winning participants equals the second participant in the order of winning participants ("place").

Ninth—first participant in the predicted order of winning participants equals the third participant in the order of winning participants ("show").

Tenth—first participant in the predicted order of winning participants equals the fourth, fifth, sixth and so on participant in the order of winning participants ("position of winner").

In some embodiments, the rankings include, but are not limited to, the following:
1. First 5 (First 5 in correct order).
2. First 4 (First 4 in correct order).
3. Tricast (First 3 in correct order).
4. Trio (First 3 in any order).
5. Forecast (First 2 in correct order).
6. Quinella (First 2 in any order).
7. Win (Winner of the race).
8. Place (The participant assigned by the player to be the winner, has to be positioned second).
9. Show (The participant assigned by the player to be the winner, has to be positioned third).
10. Position of Winner (The participant assigned by the player to be the winner, has to be positioned fourth, sixth, fifth and so on in the order of winning participants).

In some embodiments, the game may also include a wager on the event independent of the game. In some embodiments, this may include a "place it also as a bet" player option. In some embodiments, the wager may be a "tricast" selection as described above.

In some embodiments, more than one group of players ("table") may play the game. In some embodiments, players may change tables to continue playing the game. In some embodiments, the player's may change tables quickly and/or frequently to reduce time intervals between events.

In some embodiments, players may play at more than one table. In some embodiments, player may participate in tournaments related to the game with prizes provided to the winning players.

In some embodiments, the present invention is a computer-implemented method for playing a game that includes displaying, on a screen of an electronic device, a group of X numbers to an at least one first player, wherein each number in the group of X numbers corresponds to a participant in an event. In an embodiment, the method further includes receiving, by the at least one specifically programmed computer system, a first group of N numbers from the group of X numbers for the at least one first player, wherein each number in the first group of N numbers is selected based, at least in part, on: (i) a first selection made by the at least one first player, or (ii) a first random selection made by the computer system.

In some embodiments X corresponds to the number of participants in the event. In some embodiments, X ranges from 2 to 30. In some embodiments, X ranges from 2 to 25. In some embodiments, X ranges from 2 to 20. In some embodiments, X ranges from 2 to 15. In some embodiments, X ranges from 2 to 12. In some embodiments, X ranges from 2 to 10. In some embodiments, X ranges from 2 to 8. In some embodiments, X ranges from 2 to 7. In some embodiments, X ranges from 2 to 6. In some embodiments, X ranges from 5 to 30. In some embodiments, X ranges from 8 to 30. In some embodiments, X ranges from 10 to 30. In some embodiments, X ranges from 12 to 30. In some embodiments, X ranges from 14 to 30. In some embodiments, X ranges from 18 to 30. In some embodiments, X ranges from 20 to 30. In some embodiments, X is 6. In some embodiments, X is 8. In some embodiments, X is 10. In some embodiments, X is 12. In some embodiments, X is 15. In some embodiments, X is 20. In some embodiments X is greater than 30.

In some embodiments N is less than or equal to X. In some embodiments, N ranges from ranges from 2 to 30. In some embodiments, X ranges from 2 to 25. In some embodiments, X ranges from 2 to 20. In some embodiments, N ranges from 2 to 15. In some embodiments, N ranges from 2 to 12. In some embodiments, N ranges from 2 to 10. In some embodiments, N ranges from 2 to 8. In some embodiments, N ranges from 2 to 7. In some embodiments, N ranges from 2 to 6. In some embodiments, N ranges from 2 to 5. In some embodiments, N ranges from 5 to 30. In some embodiments, N ranges from 8 to 30. In some embodiments, N ranges from 7 to 30. In some embodiments, N ranges from 10 to 30. In some embodiments, N ranges from 15 to 30. In some embodiments, N ranges from 20 to 30. In some embodiments, N is 2. In some embodiments, N is 3. In some embodiments, N is 4. In some embodiments, N is 5. In some embodiments, N is 6. In some embodiments, N is 7. In some embodiments, N is 8. In some embodiments, N is 9. In some embodiments, N is greater than 10. In some embodiments, N is greater than 15. In some embodiments, N is greater than 20.

In some embodiments, the method includes receiving, by the at least one specifically programmed computer system, a first sequence of the first group of N numbers for the at least one first player, wherein the first sequence of the first group of N numbers is selected based, at least in part, on: (i) a second selection made by the at least one first player, or (ii) a second random selection made by the computer system, and wherein N is greater than or equal to two.

In some embodiments, the method includes displaying, on the screen of the electronic device, the group of X numbers to an at least one second player and receiving, by the at least one specifically programmed computer system, the second group of N numbers from the group of X numbers for the at least one second player, wherein each number in the second group of N numbers is selected based, at least in part, on: (i) a third selection made by the at least one second player, or (ii) a third random selection made by the computer system.

In some embodiments, the method includes receiving, by the at least one specifically programmed computer system, a second sequence of the second group of N numbers for the at least one second player, wherein the second sequence of the second group of N numbers is selected based, at least in part, on: (i) a fourth selection made by the at least one second player, or (ii) a fourth random selection made by the computer system.

In some embodiments, receiving, by the at least one specifically programmed computer system, a first wager or a first fold indication from the at least one first player, wherein receiving the first fold indication results in the at least one first player withdrawing from the game; and receiving, by the at least one specifically programmed computer system, a first raise indication, a first call indication, or a second fold indication from the at least one second player, wherein receiving the first raise indication results in receiving a second wager from the at least one second player greater than the first wager, wherein receiving the first call indication results in receiving the second wager from the at least one second player equal to the first wager, and wherein receiving the second fold indication results in the at least one second player withdrawing from the game.

In some embodiments, the method includes receiving, by the at least one specifically programmed computer system, a result of the event, wherein the result of the event comprises: (i) N winning numbers corresponding to winning participants, and (ii) a winning sequence of the N winning numbers, and wherein the winning sequence of the N winning numbers is based on a winning order of the winning participants.

In some embodiments, the method includes receiving, by the at least one specifically programmed computer system, a third wager or a third fold indication from the at least one first player, wherein receiving the third fold indication results in the at least one first player withdrawing from the game and receiving, by the at least one specifically programmed computer system, a second raise indication, a second call indication or a fourth fold indication from the at least one second player, wherein receiving the second raise indication results in receiving a fourth wager from the at least one second player greater than the third wager, wherein receiving the second call indication results in receiving the fourth wager from the at least one second player equal to the third wager, wherein receiving the fourth fold indication results in the at least one second player withdrawing from the game, and wherein the wagers received from the at least one first player and the at least one second player form a winning pool.

In some embodiments, the method includes comparing, by the at least one specifically programmed computer system, the N winning numbers to: (i) the first group of N numbers and (ii) the second group of N numbers and comparing, by the at least one specifically programmed computer system, the winning sequence of the N winning numbers to: (i) the first sequence of N numbers in the first group and (ii) the second sequence of N numbers in the second group.

In some embodiments, the method includes identifying, based on the comparing steps, from the at least one first player and the at least one second player, at least one winning player matching winning criteria of a higher ranking winning category; wherein winning categories comprise: (i) a highest ranked winning category with winning criteria comprising: (a) the N numbers in the group associated with the at least one winning player match the N winning numbers and (b) the sequence of the N numbers in the group associated with the at least one winning player match the winning sequence of N winning numbers; (ii) a second winning category with winning criteria comprising: the N numbers in the group associated with the at least one winning player match the N winning numbers.

In some embodiments, the at least one winning player includes two or more winning players matching the same ranking winning category.

In some embodiments, the method includes distributing, by the at least one specifically programmed computer system, the winning pool to the at least one winning player.

In some embodiments, the method includes winning categories that include: (iii) a third winning category with winning criteria comprising: (a) N−1 numbers in the group associated with the at least one winning player match N−1 winning numbers and (b) a first number and a second number in the sequence of the N numbers in the group associated with the at least one winning player match a corresponding first number and a corresponding second number in the winning sequence of N winning numbers.

In some embodiments, the method includes winning categories that include: (iv) a fourth winning category with winning criteria comprising: (a) the first number in the sequence of the N numbers in the group associated with the at least one winning player matches either the first number or the second number in the winning sequence of N winning numbers and (b) the second number in the sequence of the N numbers in the group associated with the at least one winning player matches either the first number or the second number in the winning sequence of N winning numbers and (v) a fifth winning category with winning criteria comprising the first number in the sequence of the N numbers in the group associated with the at least one winning player matches the corresponding first number in the winning sequence of N winning numbers.

In some embodiments, the method includes winning categories that include: (vi) a sixth winning category with winning criteria comprising the first number in the sequence of the N numbers in the group associated with the at least one winning player matches the second number in the winning sequence of N winning numbers; and (vii) a seventh winning category with winning criteria comprising the first number in the sequence of the N numbers in the group associated with the at least one winning player matches a third number in the winning sequence of N winning numbers.

In some embodiments, the method includes winning categories that include: (viii) an eighth winning category with winning criteria comprising the first number in the sequence of the N numbers in the group associated with the at least one winning player matches a fourth number in the winning sequence of N winning numbers.

In some embodiments, the method includes winning categories that include: (ix) a ninth winning category with winning criteria comprising the first number in the sequence of the N numbers in the group associated with the at least one winning player matches a fifth number in the winning sequence of N winning numbers; and (x) a tenth winning category with winning criteria comprising the first number in the sequence of the N numbers in the group associated with the at least one winning player matches a sixth number in the winning sequence of N winning numbers.

In some embodiments, the method includes winning categories that include: (xi) an eleventh winning category with winning criteria comprising the first number in the sequence of the N numbers in the group associated with the at least one winning player matches a seventh number in the winning sequence of N winning numbers; and (xii) a twelfth winning category with winning criteria comprising the first number in the sequence of the N numbers in the group associated with the at least one winning player matches an eighth number in the winning sequence of N winning numbers.

In some embodiments, the method includes receiving, by the at least one specifically programmed computer system, a fifth wager or a fifth fold indication from the at least one first player, wherein receiving the fifth fold indication results in the at least one first player withdrawing from the game; and receiving, by the at least one specifically programmed computer system, a third raise indication, a third call indication or a sixth fold indication from the at least one second player, wherein receiving the third raise indication results in receiving a sixth wager from the at least one second player greater than the fifth wager, wherein receiving the third call indication results in receiving the sixth wager from the at least one second player equal to the fifth wager, wherein receiving the sixth fold indication results in the at least one second player withdrawing from the game.

In some embodiments, the receiving, by the at least one specifically programmed computer system, the fifth wager or the fifth fold indication from the at least one first player step and the receiving, by the at least one specifically programmed computer system, the third raise indication, the third call indication or the sixth fold indication from the at least one second player step are completed before the receiving, by the at least one specifically programmed computer system, the result of the event step.

In some embodiments, the method includes generating, by the at least one specifically programmed computer system, at least one first game piece; and generating, by the at least one specifically programmed computer system, at least one second game piece.

In some embodiments, the method includes N ranging from 2 to 15. In some embodiments, the method includes N ranging from 2 to 5.

In some embodiments, the method includes X equals to a number of participants in the event.

In some embodiments, the method includes an event that is selected from the group consisting of a live event, a virtual event, a past event, and combinations thereof.

In some embodiments, the method includes a past event that is recorded prior to receiving, by the at least one specifically programmed computer system, the result of the event step. In some embodiments, the recording of the past event is conducted by any known method of recording the audio, video, or other feature of the event.

In some embodiments, the method includes an event that is an event having a sequential finishing order. As used herein, "an event having a sequential finishing order" means the event is configured such that the participants in the event can be ranked, for example, first, second, . . . last based, at least in part, on the result of the event.

In some embodiments, the method includes an event selected from the group consisting of horse racing, greyhound racing, automobile racing, motorcycle racing, football, basketball, baseball, soccer, and hockey.

In some embodiment, the present invention is a computer system that includes at least one specialized computer machine that includes a non-transient memory having at least one region for storing particular computer executable program code; and at least one processor for executing the particular program code stored in the memory, wherein the particular program code is configured to at least perform the following operations: displaying, on a screen of an electronic device, a group of X numbers to an at least one first player, wherein each number in the group of X numbers corresponds to a participant in an event.

In some embodiments, the particular program code is configured to at least perform the following: receiving, by an at least one specifically programmed computer system, a first group of N numbers from the group of X numbers for the at least one first player, wherein each number in the first group of N numbers is selected based, at least in part, on: (i) a first selection made by the at least one first player, or (ii) a first random selection made by the computer system; and receiving, by the at least one specifically programmed computer system, a first sequence of the first group of N numbers for the at least one first player, wherein the first sequence of the first group of N numbers is selected based, at least in part, on: (i) a second selection made by the at least one first player, or (ii) a second random selection made by the computer system and wherein N is greater than or equal to two.

In some embodiments, the particular program code is configured to at least perform the following: displaying, on the screen of the electronic device, the group of X numbers to an at least one second player; receiving, by the at least one specifically programmed computer system, the second group of N numbers from the group of X numbers for the at least one second player, wherein each number in the second group of N numbers is selected based, at least in part, on: (i) a third selection made by the at least one second player, or (ii) a third random selection made by the computer system and receiving, by the at least one specifically programmed computer system, a second sequence of the second group of N numbers for the at least one second player, wherein the second sequence of the second group of N numbers is selected based, at least in part, on: (i) a fourth selection made by the at least one second player, or (ii) a fourth random selection made by the computer system.

In some embodiments, the particular program code is configured to at least perform the following: receiving, by the at least one specifically programmed computer system, a first wager or a first fold indication from the at least one first player, wherein receiving the first fold indication results in the at least one first player withdrawing from the game; and receiving, by the at least one specifically programmed computer system, a first raise indication, a first call indication, or a second fold indication from the at least one second player, wherein receiving the first raise indication results in receiving a second wager from the at least one second player greater than the first wager, wherein receiving the first call indication results in receiving the second wager from the at least one second player equal to the first wager, and wherein receiving the second fold indication results in the at least one second player withdrawing from the game and receiving, by the at least one specifically programmed computer system, a result of the event, wherein the result of the event comprises: (i) N winning numbers corresponding to winning participants, and (ii) a winning sequence of the N winning numbers, wherein the winning sequence of the N winning numbers is based on a winning order of the winning participants.

In some embodiments, the particular program code is configured to at least perform the following: receiving, by the at least one specifically programmed computer system, a third wager or a third fold indication from the at least one first player, wherein receiving the third fold indication results in the at least one first player withdrawing from the game and receiving, by the at least one specifically programmed computer system, a second raise indication, a second call indication or a fourth fold indication from the at least one second player, wherein receiving the second raise indication results in receiving a fourth wager from the at least one second player greater than the third wager, wherein receiving the second call indication results in receiving the fourth wager from the at least one second player equal to the third wager, wherein receiving the fourth fold indication results in the at least one second player withdrawing from the game, and wherein the wagers received from the at least one first player and the at least one second player form a winning pool.

In some embodiments, the particular program code is configured to at least perform the following: comparing, by the at least one specifically programmed computer system, the N winning numbers to: (i) the first group of N numbers and (ii) the second group of N numbers and comparing, by the at least one specifically programmed computer system, the winning sequence of the N winning numbers to: (i) the first sequence of N numbers in the first group and (ii) the second sequence of N numbers in the second group.

In some embodiments, the particular program code is configured to at least perform the following: identifying, based on the comparing steps, from the at least one first player and the at least one second player, a at least one winning player matching winning criteria of a higher ranking winning category, wherein winning categories comprise: (i) a highest ranked winning category with winning criteria comprising: (a) the N numbers in the group associated with the at least one winning player match the N winning numbers and (b) the sequence of the N numbers in the group associated with the at least one winning player match the winning sequence of N winning numbers, (ii) a second winning category with winning criteria comprising: the N numbers in the group associated with the at least one winning player match the N winning numbers, and (iii) a third winning category with winning criteria comprising: (a) N−1 numbers in the group associated with the at least one winning player match N−1 winning numbers and (b) a first number and a second number in the sequence of the N numbers in the group associated with the at least one winning player match a corresponding first number and a corresponding second number in the winning sequence of N winning numbers.

In some embodiments, the particular program code is configured to at least perform the following: distributing, by the at least one specifically programmed computer system, the winning pool to the at least one winning player.

In some embodiments, the winning categories further comprise: (iv) a fourth winning category with winning criteria comprising: (a) the first number in the sequence of the N numbers in the group associated with the at least one winning player matches either the first number or the second number in the winning sequence of N winning numbers and (b) the second number in the sequence of the N numbers in the group associated with the at least one winning player matches either the first number or the second number in the winning sequence of N winning numbers, (v) a fifth winning category with winning criteria comprising the first number in the sequence of the N numbers in the group associated with the at least one winning player matches the corresponding first number in the winning sequence of N winning numbers, (vi) a sixth winning category with winning criteria comprising the first number in the sequence of the N numbers in the group associated with the at least one winning player matches the second number in the winning sequence of N winning numbers, and (vii) a seventh winning category with winning criteria comprising the first number in the sequence of the N numbers in the group associated with the at least one winning player matches a third number in the winning sequence of N winning numbers.

In some embodiments, the winning categories further comprise: (viii) an eighth winning category with winning criteria comprising the first number in the sequence of the N numbers in the group associated with the at least one winning player matches a fourth number in the winning sequence of N winning numbers, (ix) a ninth winning category with winning criteria comprising the first number in the sequence of the N numbers in the group associated with the at least one winning player matches a fifth number in the winning sequence of N winning numbers, and (x) a tenth winning category with winning criteria comprising the first number in the sequence of the N numbers in the group associated with the at least one winning player matches a sixth number in the winning sequence of N winning numbers.

In some embodiments, the winning categories further comprise: (xi) an eleventh winning category with winning criteria comprising the first number in the sequence of the N numbers in the group associated with the at least one winning player matches a seventh number in the winning sequence of N winning numbers; and (xii) a twelfth winning category with winning criteria comprising the first number in the sequence of the N numbers in the group associated with the at least one winning player matches an eighth number in the winning sequence of N winning numbers.

In some embodiments, N ranges from 2 to 15. In some embodiments, N ranges from 2 to 5.

In some embodiments, the event is selected from the group consisting of a live event, a virtual event, a past event, and combinations thereof. In some embodiments, the past event is recorded prior to receiving, by the at least one specifically programmed computer system, the result of the event step.

In some embodiments, the event is an event having a sequential finishing order. In some embodiments, the event is selected from the group consisting of horse racing, greyhound racing, automobile racing, motorcycle racing, football, basketball, baseball, soccer, and hockey.

Illustrative Example for Conducting Games of the Present Invention

A non-limiting example of the games of the present invention using three game pieces is shown in the screen shots of FIGS. 3-10.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

The invention claimed is:

1. A computer-implemented method for playing a competition-based poker-based game, comprising:
electronically and in real-time causing to display, by at least one specifically programmed computer processor, a plurality of poker-based game pieces corresponding to a group of X numbers on a screen of a first electronic device associated with at least one first player,
wherein each number in the group of X numbers corresponds to a participant in at least one competition event, and
wherein each poker-based game piece of the plurality of poker-based game pieces displays a particular number selected from 1 to n which corresponds to a particular number from the group X numbers corresponding to a particular participant of a particular competition event;
electronically and in real-time receiving, by the at least one specifically programmed computer processor, a first group of N numbers from the group of X numbers for the at least one first player,
wherein each number in the first group of N numbers is selected based, at least in part, on:
(i) a first selection made by the at least one first player, or
(ii) a first random selection made by the computer processor;
electronically and in real-time receiving, by the at least one specifically programmed computer processor, a first sequence of the first group of N numbers for the at least one first player,
wherein the first sequence of the first group of N numbers is selected based, at least in part, on:
(i) a second selection made by the at least one first player, or
(ii) a second random selection made by the computer system, and
wherein N is greater than or equal to two;
electronically and in real-time causing to display, by the at least one specifically programmed computer processor, the plurality of poker-based game pieces corresponding to the group of X numbers on a screen of a second electronic device associated with at least one second player;
electronically and in real-time receiving, by the at least one specifically programmed computer processor, a second group of N numbers from the group of X numbers for the at least one second player,
wherein each number in the second group of N numbers is selected based, at least in part, on:
(i) a third selection made by the at least one second player, or
(ii) a third random selection made by the computer processor;
electronically and in real-time receiving, by the at least one specifically programmed computer processor, a second sequence of the second group of N numbers for the at least one second player,
wherein the second sequence of the second group of N numbers is selected based, at least in part, on:
(i) a fourth selection made by the at least one second player, or
(ii) a fourth random selection made by the computer processor,
electronically and in real-time receiving, by the at least one specifically programmed computer processor, a first wager or a first fold indication from the at least one first player,
wherein the receiving of the first fold indication results in the at least one first player withdrawing from the competition-based poker-based game; and
electronically and in real-time receiving, by the at least one specifically programmed computer processor, a first raise indication, a first call indication, or a second fold indication from the at least one second player,
wherein the receiving of the first raise indication results in receiving a second wager from the at least one second player, wherein the second wager is greater than the first wager,
wherein the receiving of the first call indication results in receiving the second wager from the at least one second player, wherein the second wager is equal to the first wager, and
wherein the receiving of the second fold indication results in the at least one second player withdrawing from the competition-based poker-based game;
electronically and in real-time receiving, by the at least one specifically programmed computer processor, at least one result of the at least one competition event,
wherein the at least one result of the at least one competition event comprises:
(i) N winning numbers corresponding to winning participants, and
(ii) a winning sequence of the N winning numbers, wherein the winning sequence of the N winning numbers is based on a winning order of the winning participants;
electronically and in real-time receiving, by the at least one specifically programmed computer processor, a third wager or a third fold indication from the at least one first player,
wherein the receiving of the third fold indication results in the at least one first player withdrawing from the competition-based poker-based game;
electronically and in real-time receiving, by the at least one specifically programmed computer processor, a second raise indication, a second call indication or a fourth fold indication from the at least one second player,
wherein the receiving of the second raise indication results in receiving a fourth wager from the at least one second player, wherein the fourth wager is greater than the third wager,
wherein the receiving of the second call indication results in receiving the fourth wager from the at least one second player, wherein the fourth wager is equal to the third wager,
wherein the receiving of the fourth fold indication results in the at least one second player withdrawing from the competition-based poker-based game,
wherein each of the receiving of the first, second, third, and fourth wagers is in a form of currency, credit or debit card, an electronic payment or any combination thereof,
wherein the electronic payment is received via an electronic payment accepting device for accepting wagers by interacting with electronic devices of players which are being positioned in a proximity of the electronic payment accepting device, and
wherein the wagers received from the at least one first player and the at least one second player form a winning pool;
dynamically and in real-time, comparing, by the at least one specifically programmed computer processor, the N winning numbers to:
(i) the first group of N numbers and
(ii) the second group of N numbers;
dynamically and in real-time, comparing, by the at least one specifically programmed computer processor, the winning sequence of the N winning numbers to:
(i) the first sequence of N numbers in the first group and
(ii) the second sequence of N numbers in the second group;
dynamically and in real-time, identifying, based on the comparing steps, from the at least one first player and the at least one second player, by the at least one specifically programmed computer processor, at least one winning player matching winning criteria of a higher ranking winning category of a plurality of winning categories;
wherein the plurality of winning categories comprise:
(i) a highest ranked winning category with a first plurality of winning criteria comprising:
(a) the N numbers in a particular group of N numbers associated with the at least one winning player match the N winning numbers and
(b) the sequence of the N numbers in the particular group of N numbers associated with the at least one winning player matches the winning sequence of N winning numbers;
(ii) a second winning category with a second plurality of winning criteria comprising: the N numbers in the particular group of N numbers associated with the at least one winning player match the N winning numbers; and
electronically and in real-time causing to distribute, by the at least one specifically programmed computer processor, the winning pool to the at least one winning player.

2. The method of claim 1, wherein the plurality of winning categories further comprise:
(iii) a third winning category with a third plurality of winning criteria comprising:
(a) N−1 numbers in the particular group of N numbers associated with the at least one winning player match N−1 winning numbers and
(b) a first number and a second number in the sequence of the N numbers in the particular group of N numbers associated with the at least one winning player match a corresponding first number and a corresponding second number in the winning sequence of N winning numbers.

3. The method of claim 2, wherein the plurality of wining categories further comprise:
(iv) a fourth winning category with a fourth plurality of winning criteria comprising:
(a) the first number in the sequence of the N numbers in the particular group of N numbers associated with the at least one winning player matches either the first number or the second number in the winning sequence of N winning numbers and
(b) the second number in the sequence of the N numbers in the particular group of N numbers associated with the at least one winning player matches either the first number or the second number in the winning sequence of N winning numbers and
(v) a fifth winning category with a fifth plurality of winning criteria comprising the first number in the sequence of the N numbers in the particular group of N numbers associated with the at least one winning player matches the corresponding first number in the winning sequence of N winning numbers.

4. The method of claim 3, wherein the winning categories further comprise:
(vi) a sixth winning category with a sixth plurality of winning criteria comprising the first number in the sequence of the N numbers in the particular group of N numbers associated with the at least one winning player matches the second number in the winning sequence of N winning numbers; and
(vii) a seventh winning category with a seventh plurality of winning criteria comprising the first number in the sequence of the N numbers in the particular group of N numbers associated with the at least one winning player matches a third number in the winning sequence of N winning numbers.

5. The method of claim 4, wherein the winning categories further comprise:
(viii) an eighth winning category with an eight plurality of winning criteria comprising the first number in the sequence of the N numbers in the particular group of N numbers associated with the at least one winning player matches a fourth number in the winning sequence of N winning numbers.

6. The method of claim 5, wherein the winning categories further comprise:
(ix) a ninth winning category with a ninth plurality of winning criteria comprising the first number in the sequence of the N numbers in the particular group of N numbers associated with the at least one winning player matches a fifth number in the winning sequence of N winning numbers; and
(x) a tenth winning category with a tenth plurality of winning criteria comprising the first number in the sequence of the N numbers in the particular group of N numbers associated with the at least one winning player matches a sixth number in the winning sequence of N winning numbers.

7. The method of claim 6, wherein the winning categories further comprise:
(xi) an eleventh winning category with an eleventh plurality of winning criteria comprising the first number in the sequence of the N numbers in the particular group of N numbers associated with the at least one winning player matches a seventh number in the winning sequence of N winning numbers; and
(xii) a twelfth winning category with a twelfth plurality of winning criteria comprising the first number in the sequence of the N numbers in the particular group of N numbers associated with the at least one winning player matches an eighth number in the winning sequence of N winning numbers.

8. The method of claim 1, further comprising:
electronically and in real-time receiving, by the at least one specifically programmed computer processor, a fifth wager or a fifth fold indication from the at least one first player,
wherein the receiving of the fifth fold indication results in the at least one first player withdrawing from the competition-based poker-based game; and
electronically and in real-time receiving, by the at least one specifically programmed computer processor, a third raise indication, a third call indication or a sixth fold indication from the at least one second player,
wherein the receiving of the third raise indication results in receiving a sixth wager from the at least one second player greater than the fifth wager,
wherein the receiving of the third call indication results in receiving the sixth wager from the at least one second player equal to the fifth wager,
wherein the receiving of the sixth fold indication results in the at least one second player withdrawing from the competition-based poker-based game.

9. The method of claim 8, wherein the receiving of the fifth wager or the fifth fold indication from the at least one first player and the receiving of the third raise indication, the third call indication or the sixth fold indication from the at least one second player are completed before the receiving of the at least one result of the at least one competition event.

10. The method of claim 1, wherein N ranges from 2 to 15.

11. The method of claim 10, wherein N ranges from 2 to 5.

12. The method of claim 1, wherein X equals a number of participants in the at least one competition event.

13. The method of claim 1, wherein the at least one competition event is selected from the group consisting of a live competition event, a virtual competition event, a past competition event, and combinations thereof.

14. The method of claim 1, wherein the at least one competition event is a competition event having a sequential finishing order.

15. The method of claim 1, wherein the at least one competition event is selected from the group consisting of horse racing, greyhound racing, automobile racing, motorcycle racing, football, basketball, baseball, soccer, and hockey.

16. A computer system, comprising:
at least one specialized computer machine, comprising:
a non-transient memory having at least one region for storing particular computer executable program code; and
at least one processor for executing the particular program code stored in the memory, wherein the particular program code is configured to at least perform the following operations:
electronically and in real-time causing to display a group of X numbers on a screen of a first electronic device associated with at least one first player,
wherein each number in the group of X numbers corresponds to a participant in at least one competition event, and wherein each poker-based game piece of the plurality of poker-based game pieces displays a particular number selected from 1 to n which corresponds to a particular number from the group X numbers corresponding to a particular participant of a particular competition event;

electronically and in real-time receiving a first group of N numbers from the group of X numbers for the at least one first player,
  wherein each number in the first group of N numbers is selected based, at least in part, on:
    (i) a first selection made by the at least one first player, or
    (ii) a first random selection made by the computer system;

electronically and in real-time receiving a first sequence of the first group of N numbers for the at least one first player,
  wherein the first sequence of the first group of N numbers is selected based, at least in part, on:
    (i) a second selection made by the at least one first player, or
    (ii) a second random selection made by the computer system and
  wherein N is greater than or equal to two;

electronically and in real-time causing to display the group of X numbers on a screen of a second electronic device associated with at least one second player;

electronically and in real-time receiving a second group of N numbers from the group of X numbers for the at least one second player,
  wherein each number in the second group of N numbers is selected based, at least in part, on:
    (i) a third selection made by the at least one second player, or
    (ii) a third random selection made by the computer system;

electronically and in real-time receiving a second sequence of the second group of N numbers for the at least one second player,
  wherein the second sequence of the second group of N numbers is selected based, at least in part, on:
    (i) a fourth selection made by the at least one second player, or
    (ii) a fourth random selection made by the computer system;

electronically and in real-time receiving, by the at least one specifically programmed computer system, a first wager or a first fold indication from the at least one first player,
  wherein the receiving of the first fold indication results in the at least one first player withdrawing from the competition-based poker-based game; and electronically and in real-time receiving a first raise indication, a first call indication, or a second fold indication from the at least one second player,
  wherein the receiving of the first raise indication results in receiving a second wager from the at least one second player, wherein the second wager is greater than the first wager,
  wherein the receiving of the first call indication results in receiving the second wager from the at least one second player, wherein the second wager is equal to the first wager, and
  wherein the receiving of the second fold indication results in the at least one second player withdrawing from the competition-based poker-based game;

electronically and in real-time receiving at least one result of the at least one competition event,
  wherein the at least one result of the at least one competition event comprises:
    (i) N winning numbers corresponding to winning participants, and
    (ii) a winning sequence of the N winning numbers,
      wherein the winning sequence of the N winning numbers is based on a winning order of the winning participants;

electronically and in real-time receiving a third wager or a third fold indication from the at least one first player,
  wherein the receiving of the third fold indication results in the at least one first player withdrawing from the competition-based poker-based game;

electronically and in real-time receiving a second raise indication, a second call indication or a fourth fold indication from the at least one second player,
  wherein the receiving of the second raise indication results in receiving a fourth wager from the at least one second player,
  wherein the fourth wager is greater than the third wager;
  wherein the receiving of the second call indication results in receiving the fourth wager from the at least one second player,
  wherein the fourth wager is equal to the third wager,
  wherein the receiving of the fourth fold indication results in the at least one second player withdrawing from the competition-based poker-based game,
  wherein each of the receiving of the first, second, third, and fourth wagers is in a form of currency, credit or debit card, an electronic payment or any combination thereof,
  wherein the electronic payment is received via an electronic payment accepting device for accepting wagers by interacting with electronic devices of players which are being positioned in a proximity of the electronic payment accepting device, and
  wherein the wagers received from the at least one first player and the at least one second player form a winning pool;

dynamically and in real-time, comparing the N winning numbers to:
  (i) the first group of N numbers and
  (ii) the second group of N numbers;

dynamically and in real-time, comparing the winning sequence of the N winning numbers to:
  (i) the first sequence of N numbers in the first group and
  (ii) the second sequence of N numbers in the second group;

dynamically and in real-time, identifying, based on the comparing steps, from the at least one first player and the at least one second player, a at least one winning player matching winning criteria of a higher ranking winning category of a plurality of winning categories;
  wherein the plurality of winning categories comprise:

(i) a highest ranked winning category with a first plurality of winning criteria comprising:
(a) the N numbers in a particular group of N numbers associated with the at least one winning player match the N winning numbers and
(b) the sequence of the N numbers in the particular group of N numbers associated with the at least one winning player matches the winning sequence of N winning numbers, and
(ii) a second winning category with a second plurality of winning criteria comprising: the N numbers in the particular group of N numbers associated with the at least one winning player match the N winning numbers; and
electronically and in real-time causing to distribute the winning pool to the at least one winning player.

17. The computer system of claim 16, wherein the plurality of winning categories further comprise:
(iii) a third winning category with a third plurality of winning criteria comprising:
(a) N−1 numbers in the particular group of N numbers associated with the at least one winning player match N−1 winning numbers and
(b) a first number and a second number in the sequence of the N numbers in the particular group of N numbers associated with the at least one winning player match a corresponding first number and a corresponding second number in the winning sequence of N winning numbers.

18. The computer system of claim 17, wherein the plurality of winning categories further comprise:
(iv) a fourth winning category with a fourth plurality of winning criteria comprising:
(a) the first number in the sequence of the N numbers in the particular group of N numbers associated with the at least one winning player matches either the first number or the second number in the winning sequence of N winning numbers and
(b) the second number in the sequence of the N numbers in the particular group of N numbers associated with the at least one winning player matches either the first number or the second number in the winning sequence of N winning numbers,
(v) a fifth winning category with a fifth plurality of winning criteria comprising the first number in the sequence of the N numbers in the particular group of N numbers associated with the at least one winning player matches the corresponding first number in the winning sequence of N winning numbers,
(vi) a sixth winning category with a sixth plurality of winning criteria comprising the first number in the sequence of the N numbers in the particular group of N numbers associated with the at least one winning player matches the second number in the winning sequence of N winning numbers, and
(vii) a seventh winning category with a seventh plurality of winning criteria comprising the first number in the sequence of the N numbers in the particular group of N numbers associated with the at least one winning player matches a third number in the winning sequence of N winning numbers.

19. The computer system of claim 18, wherein the winning categories further comprise:
(viii) an eighth winning category with an eight plurality of winning criteria comprising the first number in the sequence of the N numbers in the particular group of N numbers associated with the at least one winning player matches a fourth number in the winning sequence of N winning numbers,
(ix) a ninth winning category with a ninth plurality of winning criteria comprising the first number in the sequence of the N numbers in the particular group of N numbers associated with the at least one winning player matches a fifth number in the winning sequence of N winning numbers, and
(x) a tenth winning category with a tenth plurality of winning criteria comprising the first number in the sequence of the N numbers in the particular group of N numbers associated with the at least one winning player matches a sixth number in the winning sequence of N winning numbers.

20. The computer system of claim 19, wherein the winning categories further comprise:
(xi) an eleventh winning category with an eleventh plurality of winning criteria comprising the first number in the sequence of the N numbers in the particular group of N numbers associated with the at least one winning player matches a seventh number in the winning sequence of N winning numbers; and
(xii) a twelfth winning category with a twelfth plurality of winning criteria comprising the first number in the sequence of the N numbers in the particular group of N numbers associated with the at least one winning player matches an eighth number in the winning sequence of N winning numbers.

21. The computer system of claim 16, wherein N ranges from 2 to 15.

22. The computer system of claim 21, wherein N ranges from 2 to 5.

23. The computer system of claim 16, wherein the at least one competition event is selected from the group consisting of a live competition event, a virtual competition event, a past competition event, and combinations thereof.

24. The method of claim 16, wherein the at least one competition event is a competition event having a sequential finishing order.

25. The method of claim 16, wherein the at least one competition event is selected from the group consisting of horse racing, greyhound racing, automobile racing, motorcycle racing, football, basketball, baseball, soccer, and hockey.

* * * * *